United States Patent [19]

Reolid-Lopez et al.

[11] Patent Number: 5,319,708

[45] Date of Patent: Jun. 7, 1994

[54] SYSTEM FOR THE SIMULTANEOUS CODING OF A NUMBER OF TELEVISION SIGNALS AND FOR DECODING THEREOF IN RADIOFREQUENCY

[76] Inventors: Ricardo Reolid-Lopez; Emilio Diez-Follente; Jose L. Carmonia-Garcia; Jesus J. Fernandez-Vinuesa, all of Rio Vinuela, 44, 29650 Mijas-Costa (Malaga), Spain

[21] Appl. No.: 953,518

[22] Filed: Sep. 29, 1992

[30] Foreign Application Priority Data

Oct. 2, 1991 [ES] Spain ............................... P-9102165

[51] Int. Cl.$^5$ ........................................... H04N 7/167
[52] U.S. Cl. ........................................ 380/15; 380/20
[58] Field of Search ............................. 380/10, 14, 15

[56] References Cited

U.S. PATENT DOCUMENTS 4,527,195 7/1985 Cheung .
4,598,313 7/1986 Hendrickson .
5,034,981 7/1991 Leonard et al. .................. 380/5
5,144,663 9/1992 Kudelski et al. ................ 380/16

Primary Examiner—Stephen C. Buczinski
Attorney, Agent, or Firm—Lucas & Just

[57] ABSTRACT

A system for the simultaneous coding of a number of television signals and for decoding thereof in radiofrequency.

The radiofrequency TV signal or signals to be distributed undergo remodulation on at least one channel by a signal which does not alter the synchronism pedestal and which varies in accordance with an established sequence resident in the memory of the coder, offering differentiated application to each individual channel or to the whole range thereof. A data channel is also installed to include a channel identification code, an algorithmic code and a synchronisation code, these being the determinants for interpretation of the codes by a decoder at the subscriber's terminal and for application of a process of remodulation which is identical, synchronous and inverse in form to that of the coder in order to restore the original signal.

It is of application in the protection of subscriber TV channels.

13 Claims, 4 Drawing Sheets

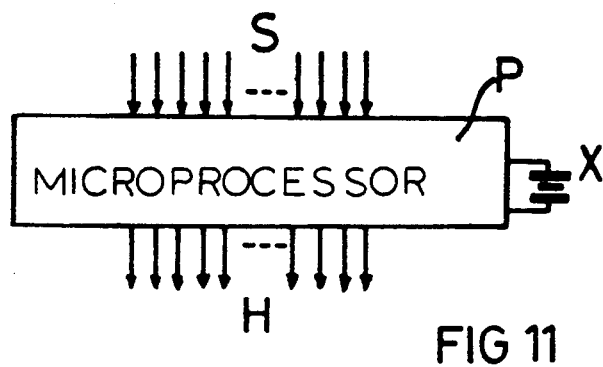
FIG 11
FIG 12
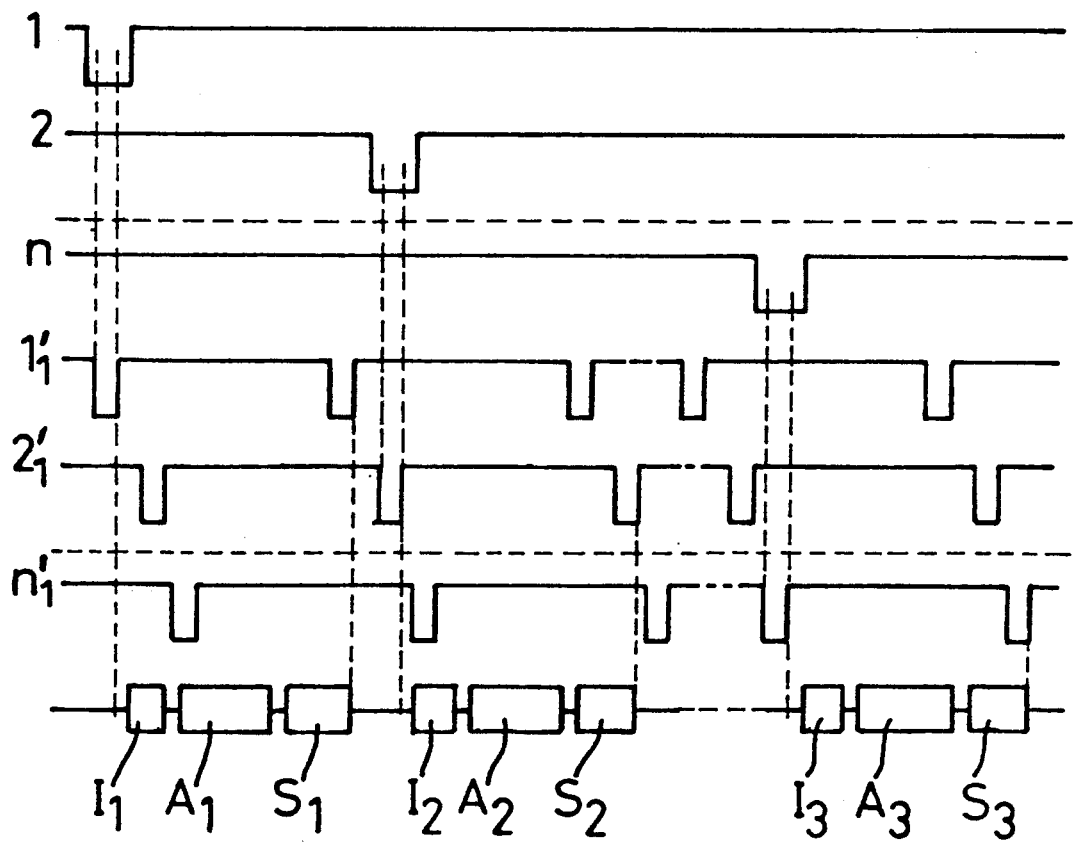

ized in RF.
SYSTEM FOR THE SIMULTANEOUS CODING OF A NUMBER OF TELEVISION SIGNALS AND FOR DECODING THEREOF IN RADIOFREQUENCY This invention relates to a system for the coding and decoding of television signals modulated in radiofrequency independently of the carrier frequency in accordance with which the aforesaid signals are modulated.

This invention combines a number of essential distinguishing features which together represent a significant improvement over other systems in use, these features, the object of this invention, being as follows:

Both the coding and decoding processes are applied to television signals modulated in RF on any channel assigned, rendering unnecessary the use of RF demodulators in the decoding process.

Coding may be carried out on one or more channels simultaneously.

A single decoder is sufficient to decode a number of channels.

Neither teletext nor any other information inserted in the unused lines of the image undergo significant modification during the coding and decoding process.

These features make this invention applicable to cable television systems, in which free access channels are normally assigned alongside pay channels, use of which is restricted to specific subscribers.

The field of application of this invention is fundamentally the cable television networks, owing to the large number of channels which it can encode simultaneously, without this, however, limiting its use in other systems of signal transmission.

Currently, owing to the growing number of television channels and the situation as regards distribution, it is becoming necessary for cable operators to arrange the services offered to their customers in a manner sufficiently flexible to adapt to the different tastes and requirements of these latter as well as achieving the lowest possible costs both for installation and for the customer, while at the same time guaranteeing sufficient protection against unauthorised use of the services.

The use of systems which differentiate between a certain number of channels is normal on cable television distribution networks.

One of the systems employed filters the band segments where the restricted access channels are located.

Another system codes the signals in video frequency and decodes them by means of a decoder supplied to the subscriber.

The first system mentioned involves the connection of selective band segment filters to the subscriber feed line of the distribution network. This system is economical to install but expensive to use, lacking flexibility, since the subscriber has to subscribe to a fixed package of a certain number of channels. Similarly, since the signals are carried by the cable without any coding, the system is very vulnerable to unauthorised manipulation, making it necessary to restrict subscriber access to the place where the filters are located.

The second system mentioned offers greater security against unauthorised manipulation, a feature of these networks being high installation costs, since in the decoding process it is necessary to demodulate the RF signal, process it and subsequently deliver it to the television receiver, in many cases involving its conversion to another frequency.

The need is clear, then, for a system which embodies to the maximum extent possible the features of protection against unauthorised use, versatility and economy.

The system offered by this invention gives a high degree of protection against unauthorised use, as the description will hereinbelow demonstrate. It furthermore offers great versatility in that it allows authorisation of any configuration of channels to each subscriber on an individual basis.

Economy is also a feature of this invention, in that demodulation of RF before decoding is not necessary, this implying a consequent reduction in the costs of installation and use.

Other objects and advantages of this invention may be more clearly understood by making reference to the description of the system given hereinbelow and to the following Figures, in which:

FIG. 11 represents a block diagram of a possible system of sequential control of initiation of coding cycles for the system of simultaneous coding of a number of TV channels.

FIG. 12 represents the graphs for amplitude against time for triggering pulses for the sequential system in relation to the synchronism graphs for a number of channels and the data sequences generated over the time in question.

DESCRIPTION OF THE SYSTEM

Every television signal coding system involves the processing of the signal so that on a standard television receiver the image appearing is falsified with respect to the original image which provided the source of the television signal in question, making the use of a decoder an absolute requirement in order to exactly reproduce the original signal.

In order to describe the coding process in the system which is the object of this invention, we shall analyse in principle its operation on a horizontal scanning element or scanning line.

Figure 1:
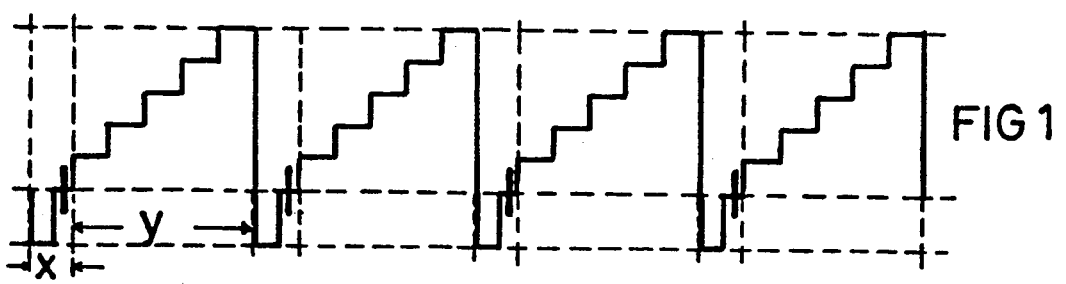
FIG. 1 represents the amplitude against time graph for horizontal scanning elements of a television picture or scanning lines.

FIG. 1 represents some video signal scanning lines, showing the segment corresponding to the synchronism pedestal X, which has a duration of 12 μsec, and the line information segment Y, with a duration of 52 μsec.

Figure 2:
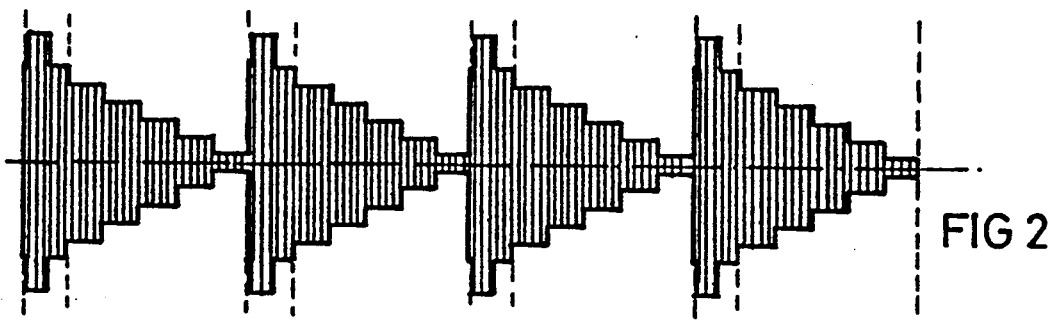
FIG. 2 represents the amplitude against time graph for the lines previously represented, negatively modulated in RF.

FIG. 2 represents the negative RF modulation signal corresponding to the video signals represented in FIG. 1.

Figure 3:
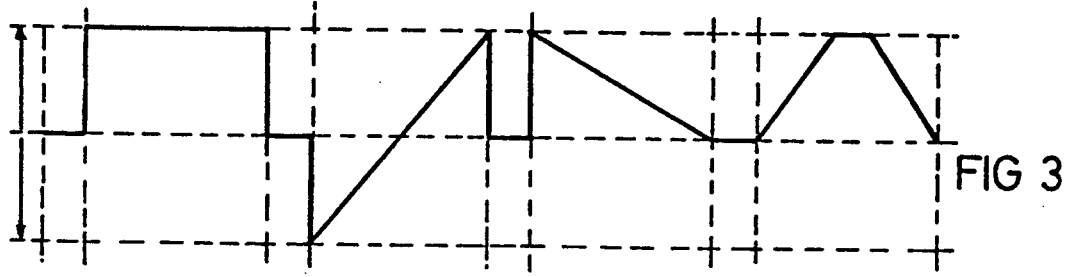
FIG. 3 represents the graphs for variable amplitude against time based on routines laid down in the coding system.

This RF signal passes to a coding modulator which remodulates it with a signal synchronised with the vertical and horizontal synchronisms extracted from the video signal which modulates the first modulator. The modulating signal passed to the coding modulator is generated in accordance with a pre-defined routine resident in the coder. Some examples of remodulating signals are represented in FIG. 3, where it can be seen that, during the 12 μsec of the synchronisation segment, the signal adopts a reference value which coincides with the synchronism value. In this way, the levels of synchronism are not modified during remodulation. The 52 μsec duration line information segment is remodulated with an amplitude-modulated signal generated by means of pre-set digital routines. FIG. 3 shows possible shapes for this amplitude-modulated signal, which is capable of adopting a large variety of shapes depending on the routines utilised from among all those defined in the coding system and resident in its memory.

Figure 4:
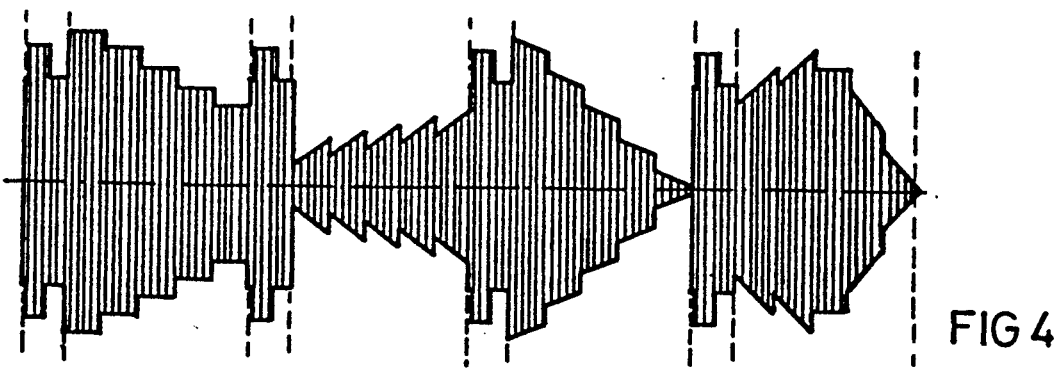
FIG. 4 represents the amplitude against time graph for the modulated signal represented in FIG. 2, remodulated by the signal represented in FIG. 3 and corresponding to the signal coded in RF leaving the coder.

On leaving the coding modulator, the remodulated signal presents a graph similar to that represented in FIG. 4. This remodulated signal is, in itself, a coded signal, since were we to supply it to a standard television receiver, the image appearing on the screen would be very different from the original, given that the luminance values at each point would differ according to the changes in amplitude of the signal with which the RF signal has been remodulated.

This remodulation takes place on all the lines comprising a raster. If the system automatically varies the order of the routines giving rise to the different remodulating signal shapes every "x" lines, "x" being a variable number within a specific segment of lines of a raster and also varying its sequences in each field in accordance with algorithms resident in the coder, a total falsification of the image on the television screen is achieved.

When the coder activates coding in synchronisation with the signal modulated in RF, remodulating it with the signals of varying amplitude with time generated through the predefined routines and following set algorithms, the microprocessor has, during the time taken for the previous line, and via a data channel, sent the codes corresponding to the algorithms which it is using, followed by a synchronisation code for the signal encoded by it.

The signal modulated in RF and thus encoded is carried alongside the data channel to the subscriber's receiver and passed to the decoder.

The coded RF signal is passed to a decoding modulator, while the codes from the data channel are recognised by the decoder and, according to the algorithm codes received, the appropriate routines resident in the decoder's memory are generated. The routines generated give rise to amplitude-modulated signals which are the inverse of those employed in the coding modulator and which synchronously modulate the decoding modulator. In this way, the RF signal originating from the first coding modulator is obtained on leaving this latter modulator.

Figure 5:
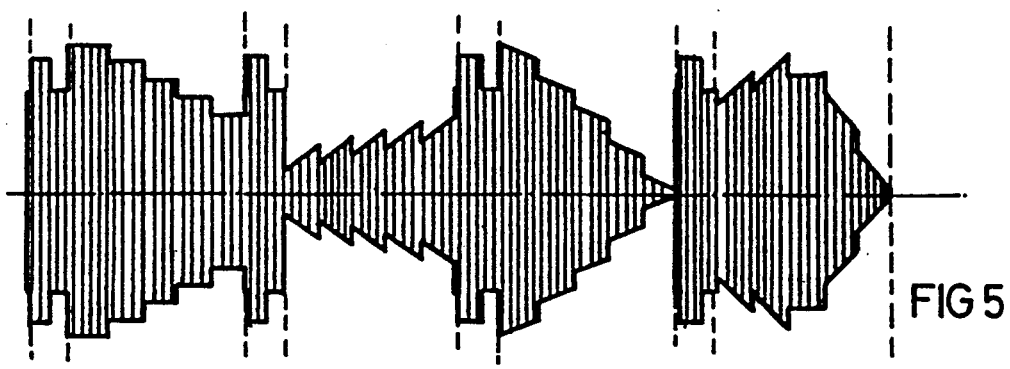
FIG. 5 represents the signal coded in RF on entry to the decoder.

This decoding process is represented in the graphs in FIGS. 5 to 8. FIG. 5 shows the signal coded in RF by the coder system in the manner hereinabove described and which is passed to the decoding modulator after being carried to the subscriber's receiver.

Figure 6:
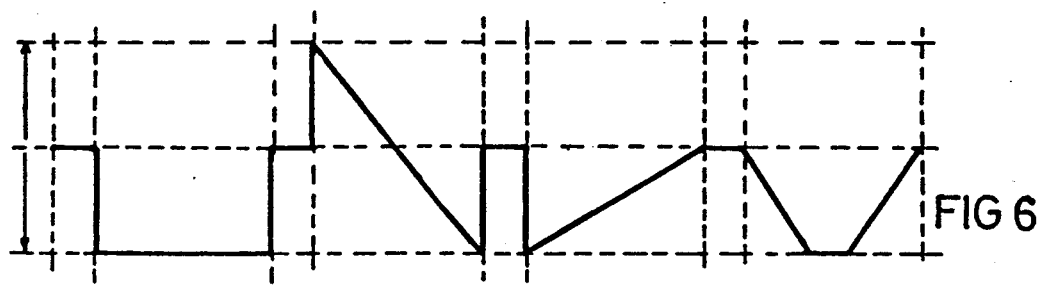
FIG. 6 represents the graphs for amplitude varying with time based on routines laid down in the decoding system.

FIG. 6 represents the amplitude-modulated signals occasioned by the routines generated by the decoder in accordance with the algorithm received via the data channel. It can be seen here that the inverses of the routines used by the coder are correct.

Figure 7:
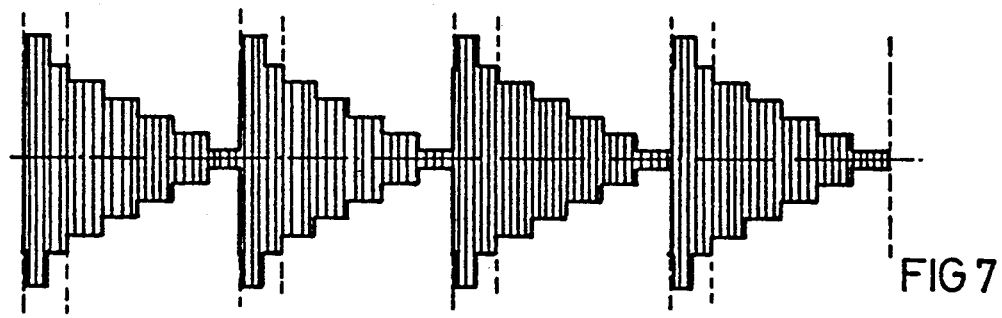
FIG. 7 represents the remodulated signal leaving the decoder system.

FIG. 7 represents the outgoing signal from the decoding modulator, being clearly identical to the outgoing signal from the first modulator before remodulation in the coding modulator.

Figure 8:
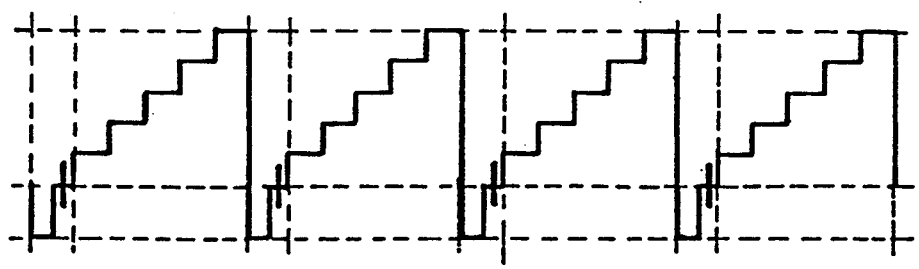
FIG. 8 represents the amplitude against time graph for horizontal scanning elements of the television picture or scanning lines demodulated by the television receiver.

FIG. 8 represents the graph for the video frequency signal demodulated by the television receiver after decoding and which clearly constitutes a true reproduction on the screen of the original image.

It will be understood that in describing the system, and in order to facilitate understanding thereof, the figures and concepts adduced herein relate to a particular system. It is however clear that it may be applied to any system. Nevertheless, the descriptions provided are illustrative and do not limit the scope or object of this invention. Any change or modification within the spirit and scope of this invention which is evident as such to an expert in the subject shall be understood to be included in this description as one more form which may be adopted by this invention.

Having provided a sufficient description of what the coding and decoding system consists of, a possible model for application is described and, subsequently, a description will be given of the way in which this system makes possible simultaneous coding of a number of TV channels using a sequential control system for the respective coders.

Figure 9:
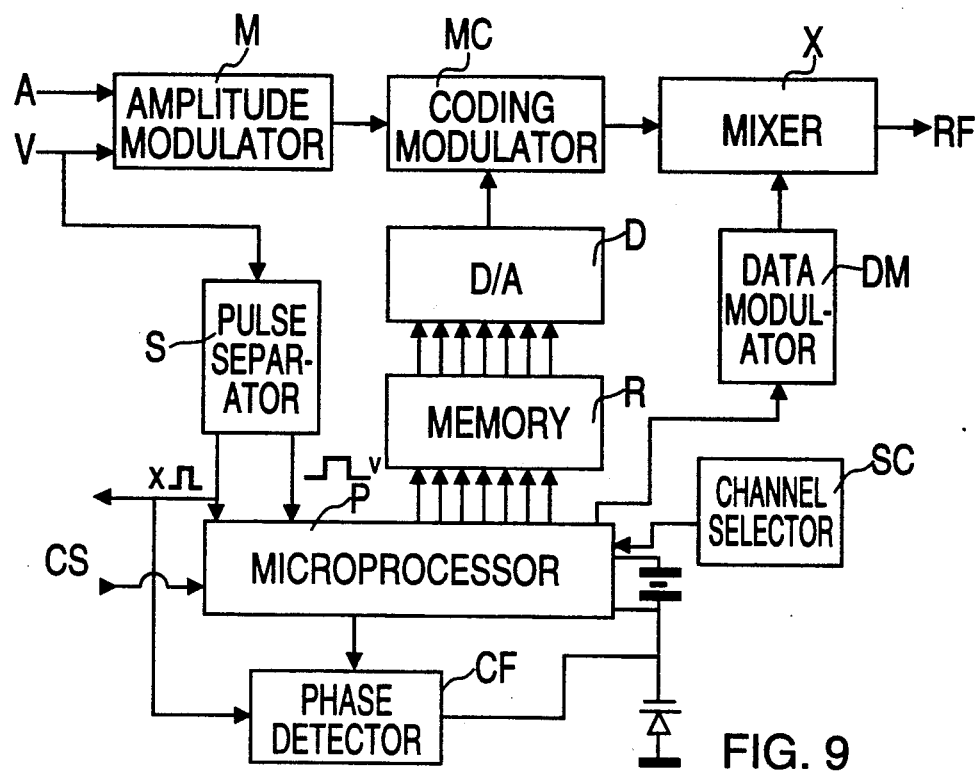
FIG. 9 represents a block diagram of a possible coder.

FIG. 9 represents, by way of example, a block diagram of a coder. The audio A and video V signals are passed to a line amplitude modulator M which modulates the signals to a specific TV channel. This signal modulated in RF is passed to a coding modulator MC which remodulates the signal in RF. A sample of the unmodulated video signal is passed to a pulse separator S. The horizontal and vertical synchronising pulses are sent to the microprocessor P. When a horizontal synchronising pulse arrives, the microprocessor P prepares an algorithm which determines which routines it will use, for how many lines it will use each of them, and in what order it will apply them for the "n+a" lines following the next synchronising pulse, where "n" is the number of TV channels which the system has to code simultaneously and "a" is a specific number of lines offset.

At the same time, the microprocessor generates three codes, which it sends to the data modulator DM. The first is a channel identification code, the second is a code for the algorithm it has selected for the next "n+a" lines, and the third is a synchronisation code. When the microprocessor P detects the next horizontal synchronising pulse, it activates the addresses of the memory containing the routines R in the order established by the algorithm, these being converted via a digital-analogue converter D to amplitude-modulated signals. These signals are then passed to the coding modulator MC, which effects synchronised remodulation of the RF signal from the first modulator M.

From this moment on, the microprocessor P starts to count "n+a" lines, in order to admit another horizontal synchronising pulse and to repeat the cycle. The signal thus coded on exit from the coding modulator MC is passed to the TV signal distribution system via a mixer X, where it is combined with the data channel.

As will be described hereinbelow, the system of simultaneous coding of a number of channels necessitates the use of a coder for each channel to be coded. The microprocessor in each of them has a channel selector SC which assigns a number to the latter. The codes corresponding to each channel, and which are sent to the decoder via the data channel, are generated over the time taken to scan one line and it is for this reason that the algorithms created by each microprocessor of each of the coders in use indicate the task to be carried out over a specific number of lines, the data channel being occupied during this time by the codes sent sequentially by the coders. The number of lines is determined, then, by the number of channels coded simultaneously by the system and by one or more offset lines, which are reserved, and for which the need will be understood when the operation of the sequential control CS as of the system is described hereinbelow.

It will be understood that in this way, even though the decoding codes are sent via the data channel sequentially, encoding of all the channels coded occurs simultaneously.

The algorithms created by the microprocessor in the coding process may either be generated randomly or following pre-established sequences.

Figure 10:
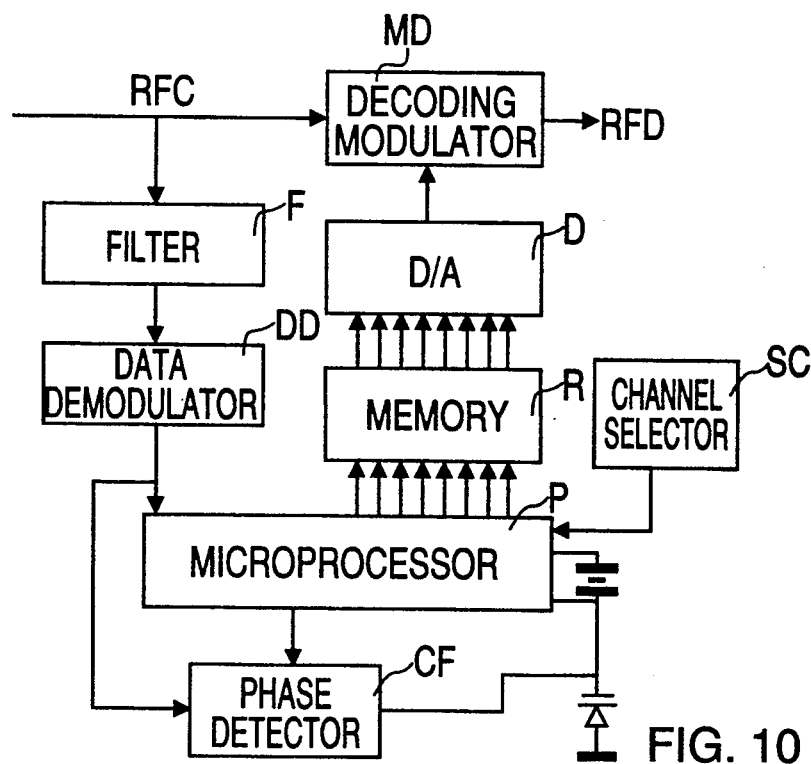
FIG. 10 represents a block diagram of a possible decoder.

FIG. 10 represents, by way of an example, the block diagram of a system decoder.

The signals picked up by the subscriber's receiver from all the TV channels (coded and uncoded) carried by the distribution system RFC are sent to a decoding modulator MD after separation of the data channel by means of a filter F. The data channel is demodulated and the data extracted are sent to a microprocessor P.

If the subscriber selects an uncoded channel SC, the decoder sends no signal to the decoding modulator and the signals in question are sent directly to the television receiver for viewing.

Where the subscriber selects a coded channel, the microprocessor will recognise from among the pieces of information it receives from the data demodulator DD the one corresponding to the channel requested, assuming that the channel in question is one of those which have been authorised.

Once the channel has been identified, the microprocessor prepares the corresponding algorithm in accordance with the information contained in the second code it receives from the data DE modulator DD. On receipt of the third code, which corresponds to synchronism, the microprocessor triggers a phase detector CF through which the decoder's oscillator is phase synchronised, and indicates the exact moment of activation of the memory addresses R of the decoder, which stores the relevant routines and which, using a digital-analogue converter D, forms an amplitude-modulated signal which is passed to the decoding modulator MD. The memory addresses so activated obey an algorithm which is generated in the microprocessor P and which is a function of the code received from the data channel and sent by the coder. These routines are such that the amplitude-modulated signal which they generate is the inverse of that used as a remodulating signal during coding.

Once the algorithm code tells the microprocessor to which, in what form, and for how many lines it should apply the routines, this latter remains inhibited until it receives a new channel code, after which a new algorithm code and synchronisation reaches it, initiating the cycle once more.

The other channels on the network will be ignored by the decoder, their codes not being recognised, either because they were not selected by the subscriber or because their use has not been authorised.

The remodulated signal RFD leaving the decoding modulator is passed to the subscriber's television receiver for viewing.

FIG. 11 provides, by way of example, a schematic representation in block form of the coding sequential control system. This consists essentially of a microprocessor P controlled by a X which receives the synchronisms S from each coder, these being obtained from their respective pulse separators. This microprocessor measures the amounts of time between the synchronisms of the different video signals as they continue to appear and assigns them an order starting with one which it takes as a reference.

In this way, the microprocessor sends a number of instructions H to each of the microprocessors in the coders, triggering them individually with respect to the pulse on which each of them should begin its coding cycle in line with the order of arrival of the horizontal synchronising pulses of the various video signals from different programmes, one of which is taken as a reference for this process. This triggering sequence occurs with a separation of 64 $\mu$sec, plus the difference offset from one synchronism to another. This offset is always less than the scanning time for a line, which explains why the sequential coding recurrence time on each channel is equal to the scanning time for as many lines as there are coded channels in the system, plus at least one offset line. In the light of the foregoing, it will now be clearly understood why the algorithms generated in the microprocessors of the coders contain all the information relating to the routines to be used for "n" lines, plus an offset of "a" lines, "a" normally being one line. This latter number of lines is fixed as desired according to the features which one wishes to add to the system. If one wishes to change the configuration of authorised channels individually for each subscriber from the system's central unit, it will be necessary to send a series of individually recognisable codes to each decoder with the desired configuration of channels. We will use the offset lines to send the said codes. So the number of lines offset will depend on the amount of information we need to send in addition to that relating to the coding-decoding process.

The system offers an additional possibility in respect of protection against unauthorised use, since each time the signal taken as a time of arrival reference for the others varies, the sequence in which the codes corresponding to each channel are sent by the data line changes, making it more difficult for anyone trying, without authorisation, to decode the coded signals by observing the recurrence frequencies of the codes on the data channel.

FIG. 12 gives a schematic view of the synchronisation graphs for a number of TV signals. The first three graphs 1, 2, n, refer to the triggering pulses from the sequential control system, which it sends to the coder for each channel in an order which it determines. It may be observed that when a coder is triggered on receipt of a horizontal synchronisation pulse 1, 2, n, during the time taken by the following line it transmits, via the data channel, the three codes corresponding to channel identification I, the algorithm code A prepared during that time and the synchronisation code S. It should be noted that these codes are transmitted on the data channel in the same order as that of arrival of the television signals coded and with a separation between them equal to the time taken for one line plus the period of delay between a channel synchronising pulse and the one which precedes it.

Up to now, what has been described is a system which codes and decodes a number of television signals simultaneously and which uses a data channel. It is held to be evident that the system is also applicable to a single channel, the possibility of sending the relevant codes as insertions in reserved picture lines providing a substitute for the data channel. Therefore, the coding and decoding of a single television signal modulated in RF in the manner described in this instrument shall be deemed to be an obvious application of this invention and to be thus included in the said instrument.

Having provided sufficient description of the nature of this invention, it should be placed on record that the items and arrangements hereinabove described are offered by way of illustration and are therefore liable to modifications or variations of detail, insofar as these latter do not alter the effects and fundamental principles on which the invention rests.

We claim:

1. A system for the simultaneous coding of a number of television signals and for decoding thereof in radio-frequency, characterised in that the coding consists of a first remodulation of all the horizontal scanning lines of a television signal modulated in RF on any channel by an amplitude-modulated signal in perfect synchronisation with a first signal, the first remodulation obeying preset functions over the period of duration of each line and wherein synchronization is controlled so that over time corresponding to the synchronism pedestal of each line, the amplitude of the signal is constant and equal to a reference value extracted at random from a memory, and further characterised in that the decoding consists of a second remodulation, at the point of use, of all the horizontal scanning lines of the signal coded in RF by an amplitude-modulated signal and in perfect synchronisation with the coded signal, the second remodulation obeying sets functions which are the inverse of those used in the coding modulator whereby there is obtained from the decoder the same television signal modulated in RF as that which entered the system uncoded.

2. A coding system for TV signals, as in claim 1, characterised in that coding is carried out by remodulating the signal previously modulated in RF on any channel on which it is to be carried by the distribution system.

3. A coding system for TV signals modulated in RF, as in claim 1, characterised in that the RF signal passed to the coder is remodulated line by line by amplitude-modulated signals which respond to preset functions over the period of duration of a line, the different functions set being unlimited in number, and all of them adopting a constant value equal to the zero reference level over the period of duration of the synchronism pedestal of each line.

4. A coding system for TV signals modulated in RF, as in claim 3, characterised in that the amplitude of the remodulating signal during coding is constant and equal to the reference value for horizontal synchronism throughout the 12 $\mu$sec duration of the synchronism pedestal of the TV signal, the amplitude of the RF signal corresponding to the horizontal synchronism pulse not being changed.

5. A coding system for TV signals modulated in RF, as in claim 3, characterised in that the line information segments of each of the lines, having a duration of 52 $\mu$sec, are remodulated by amplitude-modulated signals and are generated by memory-resident preset routines, offering a host of variants.

6. A coding system for TV signals modulated in RF, as in claim 1, characterised in that the routines preset in the coder and which give rise to the amplitude-modulated signals which synchronously modulate each line, obey algorithms generated in the control circuits which determine the routines and number of lines on which each of them will repeat over the next "n+a" lines, "n" being the number of TV channels coded and "a" a specific number of offset lines.

7. A coding system for TV signals modulated in RF, as in claim 1, characterised in that the system has a sequential control circuit, which triggers the start of the coding cycles, following an order coinciding with the order of arrival of the horizontal synchronisation pulses of the different TV signals, in relation to one of them which it takes as a reference and wherein there is sequential recurrence of "n+a" lines for all the signals coded, "n" being the number of channels coded by the system and "a" being the number of lines defined for a predetermined offset, the offset in no case being less than the time for one line.

8. A coding system for TV signals modulated in RF, as in claim 7, characterised in that when the control circuit receives a horizontal synchronising pulse, together with a triggering pulse from the sequential control system, it generates, during the time taken for that line, a channel code, a code for the algorithm it is to use and a synchronisation code, sending them, during the aforesaid time, to the data channel modulator and activating the cycle of "n+a" lines in accordance with the algorithm chosen, just as the next horizontal synchronising pulse appears.

9. A coding system for TV signals modulated in RF, as in claim 1, characterised in that decoding is carried out by remodulating the signal which is received modulated in RF and remodulated in the coder, on any TV channel on which it has been carried to the point of use.

10. A coding system for TV signals modulated in RF, as in claim 1, characterised in that the RF signal sent to the decoder is remodulated by an amplitude-modulated signal which obeys preset, memory-resident routines, thereby giving rise to a function which is the inverse of that employed in the coding system and which is synchronised with the signal received from the channel selected by the coding system via a data channel.

11. A coding system for TV signals modulated in RF, as in claim 9, characterised in that during decoding, the preset routines which give rise to the amplitude-modulated signals which are the inverse of those generated in the coding system and which remodulate each line of the RF-modulated signal, obey algorithms generated in the control circuits of the decoding system according to a code received from the coding system via a data channel and wherein the algorithms generated identical to those which are used by the coder and which determine the routines and number of lines on which each of them will repeat over the next "n+a"

lines, "n" being the number of TV channels coded and "a" being a specific number of offset lines.

12. A coding system for TV signals modulated in RF, as in claim 1, characterised in that the coder sends three codes along a data channel, these being a channel identification code, an algorithm code and a synchronisation code.

13. A coding system for TV signals modulated in RF, as in claim 9, characterised in that both the routines used in the coding system, which give rise to the amplitude-modulated signal which remodulates the signal during coding, and also the routines which give rise to the amplitude-modulated signal which is the inverse of the former, and which remodulates the signal in the decoding system, are resident in the memories of both of the coding and decoding systems and are not carried from one system to the other.

* * * * *

UNITED STATES PATENT AND TRADEMARK OFFICE
CERTIFICATE OF CORRECTION

PATENT NO.  :  5,319,708
DATED       :  June 7, 1994
INVENTOR(S) :  Ricardo Reolid-Lopez et al.

It is certified that error appears in the above-identified patent and that said Letters Patent is hereby corrected as shown below:

Column 3, line 42, after "raster" insert ",".

Column 5, line 51, change "DE modulator" to --demodulator--.

Column 6, line 15, before "X" insert --crystal--.

Column 7, line 38, before "time" insert --the--.

Column 8, line 65, after "generated" insert --are--.

Signed and Sealed this

Twenty-seventh Day of September, 1994

Attest:

BRUCE LEHMAN

Attesting Officer

Commissioner of Patents and Trademarks